United States Patent [19]

Kalisiak

[11] Patent Number: 5,172,907
[45] Date of Patent: Dec. 22, 1992

[54] COMPENSATION FOR SKEWING OF DOCUMENTS DURING A ROTATION THROUGH A FINITE ANGLE

[75] Inventor: Michael S. Kalisiak, North Tonawanda, N.Y.

[73] Assignee: Moore Business Forms, Inc., Grand Island, N.Y.

[21] Appl. No.: 763,267

[22] Filed: Sep. 20, 1991

Related U.S. Application Data

[63] Continuation-in-part of Ser. No. 697,994, May 10, 1991.

[51] Int. Cl.$^5$ .............................................. B65H 7/14
[52] U.S. Cl. ...................... 271/227; 271/184; 271/261
[58] Field of Search .............. 271/227, 228, 265, 225, 271/270, 274, 184, 902, 261; 198/394, 401, 411, 415

[56] References Cited

U.S. PATENT DOCUMENTS

| | | | |
|---|---|---|---|
| 3,603,446 | 9/1971 | Maxey | 271/227 |
| 4,445,679 | 5/1984 | Bay | 271/227 |
| 4,500,086 | 2/1985 | Garavuso | 271/225 |
| 4,511,242 | 4/1985 | Ashbee et al. | 271/227 |
| 4,724,945 | 2/1988 | Martin | 198/412 |
| 4,855,607 | 8/1989 | Eckl | 271/227 |
| 4,877,234 | 10/1989 | Mandel | 271/225 |
| 4,955,965 | 9/1990 | Mandel | 271/225 |
| 4,971,304 | 11/1990 | Lofthus | 271/227 |

FOREIGN PATENT DOCUMENTS

| | | | |
|---|---|---|---|
| 82255 | 4/1988 | Japan | 271/228 |
| 127347 | 5/1990 | Japan | 271/228 |

*Primary Examiner*—H. Grant Skaggs
*Attorney, Agent, or Firm*—Nixon & Vanderhye

[57] ABSTRACT

The skew angle of a sheet (e.g., business form or other document) is detected by providing two sensors spaced from each other a known distance along a straight line perpendicular to the direction of conveyance of the sheet. If there is a skew, the distance travelled by the sheet leading edge between sensings by the sensors is determined, and the skew angle calculated from its tangent. First and second independent drive rollers under the sheet are driven in opposite directions of rotation to compensate for the skew angle. The rollers preferably act in conjunction with a controller (computer) to not only reorient the sheet to compensate for the skew, but also to rotate the document through a significant angle (e.g., 90°) to give the sheet a second orientation different from its initial orientation (e.g., from portrait to landscape).

16 Claims, 3 Drawing Sheets

COMPENSATION FOR SKEWING OF DOCUMENTS DURING A ROTATION THROUGH A FINITE ANGLE

CROSS REFERENCE TO RELATED APPLICATIONS

This is application is a continuation-in-part of application Ser. No. 07/697,994 filed May 10, 1991, the disclosure of which is hereby incorporated by reference herein.

BACKGROUND AND SUMMARY OF THE INVENTION

In the handling of sheets, particularly documents such as business forms, as a sheet is being conveyed in a particular direction, often the leading edge thereof will become skewed—that is, the leading edge is not perpendicular to the direction of conveyance, but assumes a particular angular orientation (a skew angle). If the sheet is skewed when presented to a device for rotating it through a finite angle, such as described in the parent application, then the sheet will not be rotated to a second orientation which is the desired orientation, but will differ by the skewed angle (either being greater or lesser than desired) by the amount of the skew angle. If the document—with the leading edge not positioned as desired—is then fed into a pressure sealer, such as the Moore commercial "Speedisealer ®" pressure seal system, the pressure rolls may pass over only a portion of the edge, thus sealing only a half or a third of the edge of the document, which could result in reject of the form, or the form could be damaged when mailed or otherwise handled. In this, and in many other situations, it is thus important to have the form positioned so that the leading edge thereof is perpendicular to the direction of conveyance into a piece of equipment.

According to the present invention, a method and apparatus are provided for simply and effectively correcting the skew angle so that the leading edge is perpendicular to the direction of rotation, or by compensating for the skew angle during rotation of the sheet through a finite angle while repositioning the sheet (e.g. from landscape to portrait mode or vice versa).

According to one aspect of the present invention, a method of reorienting a sheet having a skew using first and second drive means, rotating first and second rollers, respectively, independently of each other, and first and second sensors, is provided. The method comprises the steps of: (a) Feeding the sheet, with a leading edge and in a first orientation, in a first direction to a location adjacent the first and second rollers, at which the rollers engage the sheet. (b) at a location adjacent the first and second rollers, sensing the leading edge of the sheet with the sensors. (c) If the leading edge reaches one sensor before it reaches the other sensor, determining the distance of movement of the sheet in the first direction between sensor activations. (d) Utilizing the distance determined from step (c), calculating the angle of skew of the leading edge of the sheet; and (e) in response to (d), controlling the drive means to, in turn, control the speed and direction of rotation of the rollers, so that the rollers rotate the sheet to compensate for the skew angle to dispose the sheet in a desired second orientation. Step (d) is preferably practiced by calculating the tangent of the skew angle.

In the method according to the present invention, there may be the further step (f), in conjunction with step (e), of controlling the drive means to, in turn, control the speed and direction of the rollers, so that the rollers rotate the sheet through a predetermined angle even if the sheet is not originally skewed, so that it has the second orientation whether or not the sheet is originally skewed. There may also be the further step (g) after steps (e) and (f), of conveying a sheet in the first direction. Step (b) is preferably practiced at a location less than one-half of the dimension of the sheet in the first direction when it has the first orientation, and under the sheet while step (e) is practiced.

According to another aspect of the present invention, a sheet handling assembly is provided. The sheet handling assembly comprises: A substantially planar, generally horizontal, conveyance surface. First and second driven shafts having substantially in-line axes of rotation. First and second rollers driven by the first and second driven shafts, respectively, independently of each other, and spaced from each other along the axes of rotation. The first and second rollers each having a circumferential peripheral surface portion thereof extending up through the generally horizontal surface, so that the peripheral surface of each is above the generally horizontal surface. First and second sensors each having a sensing element extending into a position along the generally horizontal surface adjacent the rollers, the sensors spaced from each other in a direction parallel to the in-line axes of rotation of the rollers; and a controller operatively connected to the driven shafts and to said first and second sensors. The rollers are spaced from each other in a direction parallel to the in-line axes of rotation a distance equal to the spacing between the rollers along the axes of rotation. The first sensor is in alignment with the first roller, and the second sensor is in alignment with the second roller in a dimension perpendicular to the in-line axes of rotation of the rollers. The sensors may comprise photosensors, and conveyor means may be provided cooperating with the horizontal surface for conveying a sheet into operative association with, and away from the rollers and sensors.

According to yet another aspect of the present invention, apparatus for rotating the sheet is provided comprising: A conveyance surface on which a sheet, having a first orientation, travels in a first direction. First and second rollers for engaging a sheet travelling on the conveyance surface and spaced from each other in a second direction, generally transverse to the first direction. First and second drive means, operatively driving the first and second rollers, respectively, independently of each other. Sensing means for sensing the leading edge of a sheet, having the first orientation, with respect to the rollers. Control means for controlling the speed and direction of rotation of the drive means in response to the sensing means to rotate the sheet so that it has a predetermined second orientation, significantly angularly displaced from the first orientation; and wherein the sensing means further comprises means for sensing if the leading edge of a sheet is skewed with respect to the second direction, and wherein the control means comprise means, in response to a determination that the leading edge is skewed, of controlling the speed and direction of rotation of the drive means to compensate for the skew orientation of the sheet leading edge so that it is displaced to the desired predetermined second orientation, with the skew automatically compensated for. The drive means are preferably reversible motors, such as D.C. stepper motors. The sensing means comprise first and second sensors spaced from each other a predetermined distance in the second direction in a line on a center line perpendicular to the first direction, and are preferably spaced apart the same distance as the rollers in center lines parallel to them, and downstream from them.

It is the primary object of the present invention to provide a method and apparatus for compensating for the skew angle of sheets during the feeding thereof, including during rotation of the sheets from one orientation to another. This and other objects of the invention will become clear from an inspection of the detailed description of the invention and from the appended claims.

DETAILED DESCRIPTION OF THE DRAWINGS

Figure 1:
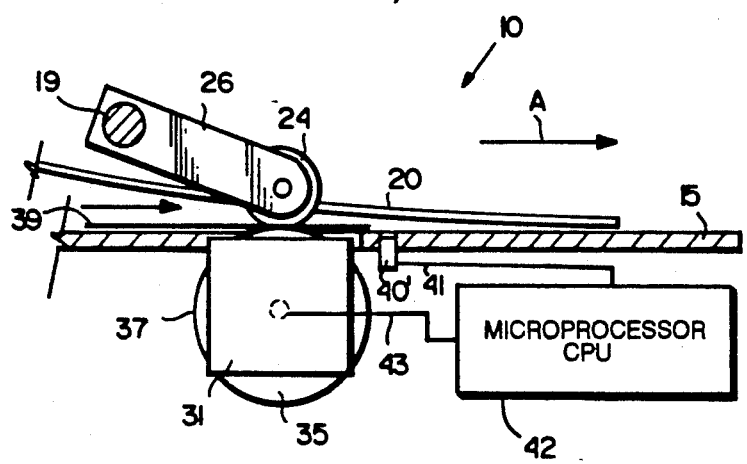
FIG. 1 is a side schematic view, partly in cross-section and partly in elevation, of operative components of the apparatus according to the invention.

In the description of the drawings, the same reference numerals will be utilized as were provided in the parent application Ser. No. 07/697,994 filed May 10, 1991, the disclosure of which has been incorporated by reference herein.

Exemplary apparatus according to the invention is shown generally by reference numeral 10 in FIG. 1. The apparatus includes a generally horizontal conveying surface 15 along which sheets are fed in the direction of arrows A (a first direction). While the surface 15 is generally horizontal, it can have a positive or negative slope. An axis 19 is provided perpendicular to the direction A, and a hold-down strap 20 of relatively flexible material may be utilized to hold the sheets (39) on the surface 15.

In order to continuously convey sheets in direction A, it is preferred to provide some sort of a conveyer, not shown in the drawings. For pivotal movement about the axis defined by the rod 19, a nip wheel 24 may be provided, connected by arms 26 to the rod 19. First and second drive means—the drive means 31 illustrated in FIG. 1, and a comparable drive means in the opposite side of the rollers 35, 36 (not shown) are provided for driving the rollers 35, 36. The drive means, such as the drive 31, are preferably reversible motors, such as conventional D.C. stepping motors (motors of the PX245 series from Oriental Motor Company Ltd.). The rollers 35, 36 are rotatable about shafts that define a common, in-line axis 33' (see FIG. 2), which is perpendicular to the direction A. The rollers 35, 36 have peripheral surfaces 37, 38, and they are mounted so that the peripheral surfaces 37, 38 extend upwardly through the surface 15 and are operatively engaged by the nip wheels (e.g., 24).

The rollers 35, 36 are spaced a relatively short distance in the dimension of axis 33', in any event a distance significantly less than the width of a sheet 39 to be acted on thereby (e.g., spaced about 2–4 inches).

The rollers 35, 36 are clamped to the shafts 33, 34. The rollers 35, 36 must be lightweight so that they have minimum inertia since they must be reversed in a fraction of a second. Yet the rollers 35, 36 must have a durable circumferential surface which has a high coefficient of friction, and a small footprint. Preferably the rollers 35, 36 are of aluminum or ABS plastic. The rollers 35, 36 may also have a roughened circumferential surface (especially if of aluminum), or a synthetic or natural rubber O-ring, or like elastomeric material, may extend around the circumferential surfaces of the rollers 35, 36.

Located downstream, in the first direction A, of the first rollers 35, 36 are sensing means for sensing the leading edge 44 (see FIGS. 2 and 3 in particular) of sheet 39. The sensing means preferably comprise first and second sensors 40, 40'. As illustrated in the drawings, the sensors 40, 40' are preferably disposed on a center line which is parallel to the line 33', and perpendicular to the direction A, and the sensors 40, 40' are preferably spaced from each other in the horizontal direction perpendicular to the direction A the same distance that the rollers 35, 36 are spaced in the dimension (e.g., 2–4 inches). The sensors 40, 40' are connected by lines 41 (e.g., fiber optic cables) with a microprocessor CPU 42, which in turn is connected via lines 43 with the motor 31 and the comparable motor for roller 36.

While the location of the edge sensors 40, 40' downstream in the direction A of the rollers 35, 36 is not particularly critical, it must be adjacent the rollers 35, 36 and a distance from the rollers in the first direction A which is less than half the shortest dimension of the sheet 39 in the direction A. Also, the sensors 40, 40' should be under the sheet 39 during rotation of the sheet 39 (if the apparatus is used for positively always rotating the document or like sheet) to prevent the sensors 40, 40' from the detecting an edge falsely. The sensors 40, 40' may be photosensors, or any other desirable conventional type of sensor which can sense a leading edge 44 of a sheet 39. For example, the sensors 40, 40' and related hardware may comprise commercially available fiber optic cable, and FEP-PAD 6 series microswitch, and devices in the MFOD (receiver) and MFOE (transmitter) series from Motorola.

Figure 2:
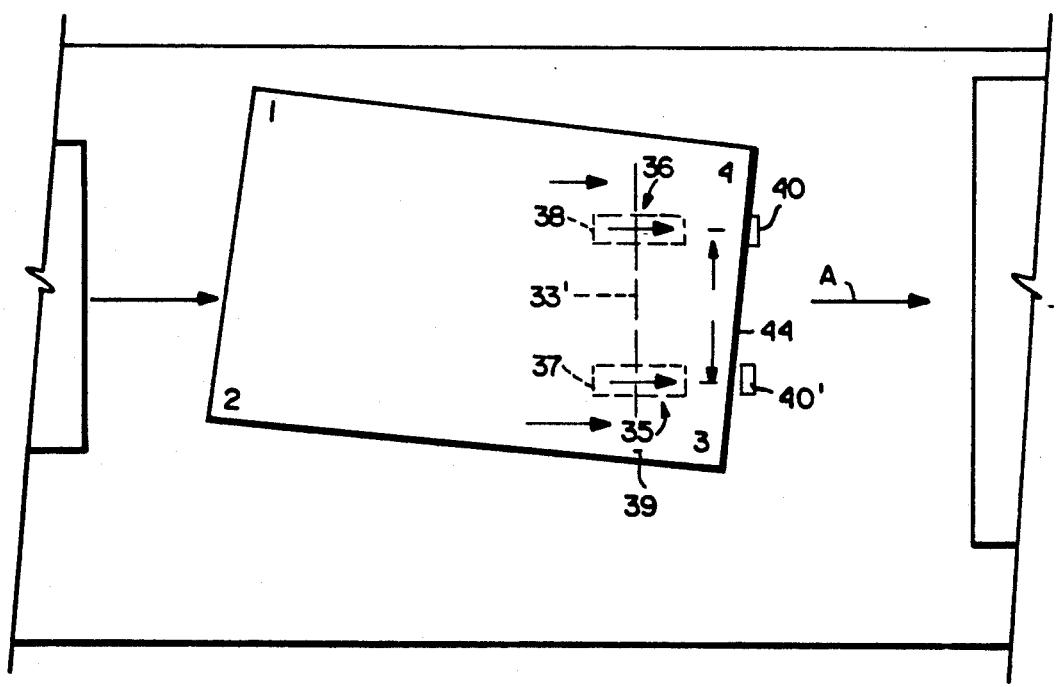
FIG. 2 is a schematic plan view illustrating the operation of the apparatus as a skewed sheet is being handled thereby.
Figure 3:
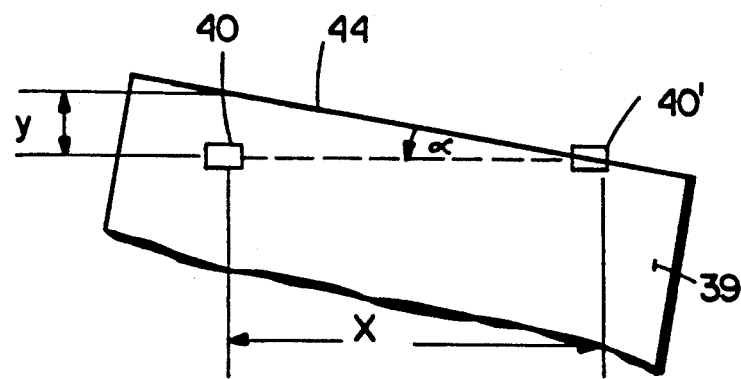
FIG. 3 is an enlarged detail view comparable to that of FIG. 2 showing the skew in more detail.

When a leading edge 44 is skewed, as illustrated in FIGS. 2 and 3, it will pass and be detected by one of the sensors 40, 40' before the other. For the example illustrated in FIGS. 2 and 3, the leading edge 44 will be sensed by the sensor 40 first and then by the sensor 40'. The time between sensing may be measured. Knowing this time and then calculating the distance y (see FIG. 3) based upon that time and the knowledge of the speed of conveyance of the sheet 39, the skew angle $\alpha$ can be calculated. By sensing the distance y itself by utilizing an incremental encoder driven by a shaft which also drives rollers or conveyance mechanisms which cause the actual travel of the document, angle $\alpha$ can also be calculated. Once the distance y is determined, since the distance x is known, the angle $\alpha$ can be calculated since the tangent of $\alpha = y \div x$. For example, if the sensors 40, 40' having a spacing of 2.0 inches, and the distance y is determined to be 0.025 inches, then the tangent of the skew angle $\alpha$ is equal to 0.025 divided by 2, equals 0.0125, resulting in an angle $\alpha$ of 0.72° (or 43 minutes of arc). If the stepper motors 31, etc., have a step resolution of 0.025 inches, that means that the compensation of one step—either to compensate for a clockwise skew (as illustrated in FIGS. 2 and 3), or a counterclockwise skew (if sensor 40' is covered first)—must occur.

The calculation of the skew angle α necessary to be compensated for is preferably accomplished by the microprocessor 42, or like components of the computer controller as described in the parent application.

Figure 4:
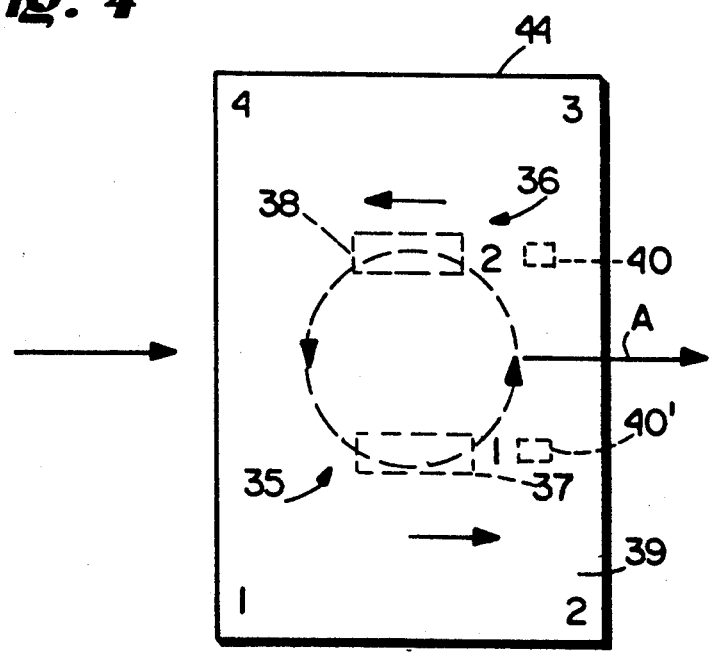
FIG. 4 is a view like that of FIG. 2 only showing the document after it has been rotated through 90° from landscape mode to portrait mode, with compensation for the skew angle.

FIG. 4 illustrates the rotation of the sheet 39 from the landscape mode to the portrait mode, with compensation for the skew angle α. As illustrated in FIG. 4, after receiving input from the sensors 40, 40', which sense the leading edge 44 of the document 39 and determine its skew angle, the microprocessor 42 controls the motor 31 and its counterpart for the roller 36 to rotate them with the directions of rotation illustrated in FIG. 4, and continues rotation of the rollers 35, 36 until the sheet 39 is in the portrait mode, that is, at a 90° angle of rotation from the position illustrated in FIG. 2 and with the skew angle α compensated for. The rollers 35, 36 are rotated at high speed, that is on the order of 400 feet per minute, in this case the rotation being accomplished merely by effecting reverse rotation of the roller 36, which occurrs for the necessary amount of time to rotate the sheet 39 ninety degrees while compensating for the skew angle α.

Figure 5:
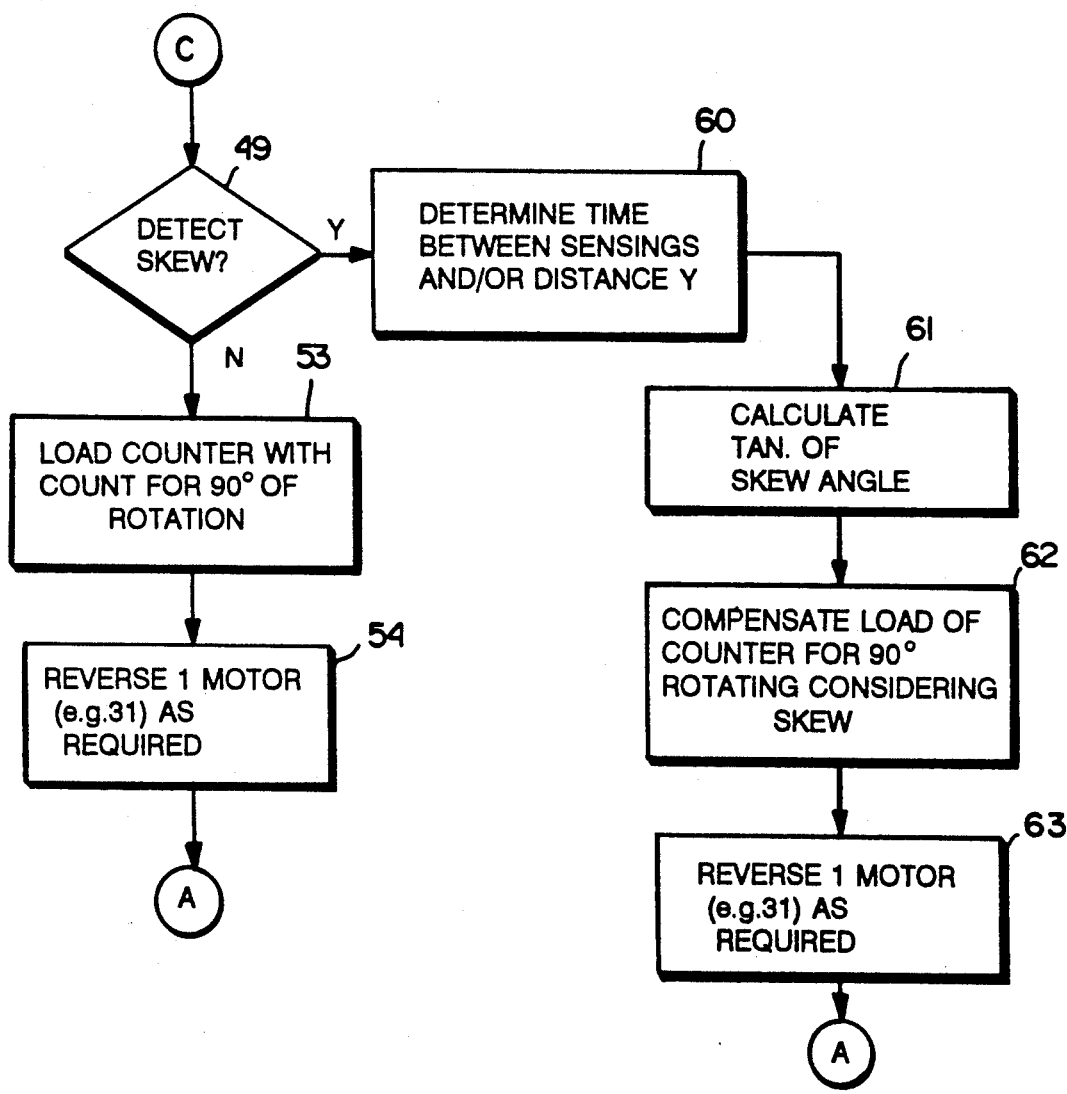
FIG. 5 is a logic flowchart illustrating an exemplary operation of the apparatus according to the invention and which can be substituted for the flowchart of FIG. 9 of the parent application.

FIG. 5 illustrates a simple logic flowchart for control of the CPU 42 with software which—if the invention is practiced in the entire system of the parent application—may be substituted for the logic flowchart of FIG. 9 therein.

At decision block 49, it is determined whether or not there is a skew of the sheet 39. If there is no skew, then the steps in blocks 53, 54 are practiced just like in the parent application. In block 60, the time between sensing is either recorded, or the distance y is directly recorded from an incremental encoder. If the time is recorded, then the distance y is calculated from the speed of travel of the document 39. In any event, once the distance y is measured or determined, at block 61 the tangent of the skew angle α is calculated, and then when the counter is loaded with a count for 90° of rotation, the skew angle is compensated for at block 62. Then at block 63 one of the motors is reversed (e.g., motor 31) as required to rotate the business form 39 to the desired second orientation (FIG. 4).

In its most basic concepts, the method according to the invention may merely be used for compensation of the skew angle, without effecting large angular orientations of a sheet. In the specific preferred embodiment, however, it is utilized in conjunction with a large degree of rotation of a sheet.

In the method of the invention, first a sheet 39 is fed, with the leading edge 44 and in the first orientation (FIGS. 2 and 3), in a first direction A to a location adjacent the rollers 35, 36, at which location the rollers 35, 36 engage the sheet 39. At a location adjacent the rollers 35, 36 the sensors 40, 40' sense the leading edge 44 of the sheet 39. If the leading edge 44 reaches one sensor (e.g., 40) before it reaches the other (40'), the distance "y" of travel of the sheet 39 in the first direction A between sensor activations is determined (either directly by an incremental coder, or by measuring the time between sensor activations and knowing the speed of conveyance of the sheet 39). Then, utilizing the distance "y" from the last step, the angle of skew α of the leading edge 44 of the sheet is calculated (by calculating a tangent) utilizing a CPU 42 or the like. In response to this calculation of the skew angle, the drive means are controlled to, in turn, control the speed and direction of rotation of the rollers 35, 36 so that the rollers 35, 36 rotate the sheet 39 to compensate for the skew angle α to dispose the sheet 39 in a desired second orientation. For example, to compensate for the skew angle α in FIGS. 2 and 3, the roller 36 would be rotated in the direction of rotation illustrated in FIG. 4 a short period of time.

In the practice of the invention, it is preferred that the sheet 39 also be rotated a large angle of rotation so as to reorient the sheet 39 in a very different orientation, for example, from the landscape orientation of FIG. 2 to the portrait orientation of FIG. 4. This is accomplished at the same time that the skew angle is compensated for, for example, by rotating the roller 36 in the direction illustrated by an arrow in FIG. 4 a longer period of time so that—in the specific embodiment illustrated—the document 39 is rotated counterclockwise 90° from the position illustrated in FIG. 2, plus the skew angle α.

It will thus be seen that according to the present invention a simple yet effective method and apparatus have been illustrated for compensating for the skew angle of a sheet, particularly while simultaneously effecting rotating of the sheet a large angle so that it has a significantly different orientation. While the method and apparatus according to the invention are particularly useful in the feeding of business forms to a pressure sealer, such as the Moore Speedisealer ® pressure system, they are applicable to a wide variety of different types of sheets and for a wide variety of different types of apparatus.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. Apparatus for rotating a sheet, comprising:
   a conveyance surface on which a sheet, having a first orientation, travels in a first direction;
   first and second rollers for engaging a sheet travelling on said conveyance surface and spaced from each other in a second direction, generally transverse to said first direction;
   first and second drive means, operatively driving said first and second rollers, respectively, independently of each other;
   sensing means for sensing the leading edge of a sheet, having said first orientation, with respect to said rollers;
   control means for controlling the speed and direction of rotation of said drive means in response to said sensing means to rotate the sheet so that it has a predetermined second orientation, a significant angular displacement from the first orientation; and
   wherein said sensing means further comprises means for sensing if the leading edge of a sheet is skewed with respect to said second direction, and wherein said control means comprise means, in response to a determination that the leading edge is skew, for controlling the speed and direction of rotation of said drive means to compensate for the skew orientation of the sheet leading edge by adding or subtracting for the significant angular displacement so that the sheet is rotated to the desired predetermined second orientation, with the skew automatically compensated for.

2. Apparatus as recited in claim 1 wherein said sensing means comprises first and second sensors spaced from each other a predetermined distance in said second direction, and lying on a centerline perpendicular to said first direction.

3. Apparatus as recited in claim 2 wherein said sensors are spaced apart in said second direction a distance equal to the spacing between said first and second rollers in said second direction, and wherein centerlines between said first and second rollers and said first and second sensors are parallel.

4. Apparatus as recited in claim 3 wherein said sensors are downstream of said rollers in said first direction.

5. Apparatus as recited in claim 3 wherein said control means comprise means for calculating the angle of skew of the leading edge of a document based upon the distance of travel of the leading edge from when one sensor detects it to when the other sensor detects it.

6. Apparatus as recited in claim 2 wherein said drive means are reversible D.C. stepper motors.

7. Apparatus as recited in claim 1 wherein said control means comprise means for calculating the angle of skew of the leading edge of document based upon the distance of travel of the leading edge from when one sensor detects it to when the other sensor detects it.

8. Apparatus as recited in claim 7 wherein said control means comprises means for effecting rotation of the sheet so that the second orientation is displaced at least about 90° from the first orientation.

9. Apparatus as recited in claim 1 wherein said sensors are downstream of said rollers in said first direction.

10. Apparatus as recited in claim 1 wherein said control means include computer means for controlling said drive means to effect rotation of the sheet by driving the first roller so that the tangential velocity thereof is in the first direction, and by driving the second roller so that the tangential velocity thereof is in a third direction.

11. Apparatus as recited in claim 10 wherein said control means comprises means for effecting rotation of the sheet so that the second orientation is displaced at least about 90° from the first orientation.

12. Apparatus as recited in claim 1 wherein said control means comprises means for effecting rotation of the sheet so that the second orientation is displaced at least about 90° from the first orientation.

13. A method of re-orienting a sheet having a skew using first and second drive means, rotating first and second rollers, respectively, independently of each other, and first and second sensors, comprising the steps of continuously, without interruption to correct for skew:
    (a) feeding the sheet, with a leading edge and in a first orientation, in a first direction to a location adjacent the first and second rollers, at which the rollers engage the sheet;
    (b) at a location adjacent the first and second rollers, sensing the leading edge of the sheet with the sensors;
    (c) if the leading edge reaches one sensor before it reaches the other sensor, determining the distance of movement of the sheet in the first direction between sensor activations;
    (d) utilizing the distance determined from step (c), calculating the angle of skew of the leading edge of the sheet; and
    (e) in response to (d), controlling the drive means to, in turn, control the speed and direction of rotation of the rollers, so that the rollers rotate the sheet to compensate for the skew angle and to dispose the sheet in a desired second orientation, at least about 90° displaced from the first orientation.

14. A method as recited in claim 13 wherein step (d) is practiced by calculating the tangent of the skew angle.

15. A method as recited in claim 13 wherein step (b) is practiced at a location less than one-half the dimension of a sheet in the first direction when it has the first orientation, and under the sheet while step (e) is practiced.

16. A method as recited in claim 15 wherein step (d) is practiced by calculating the tangent of the skew angle.

* * * * *